United States Patent Office 3,396,590
Patented Aug. 13, 1968

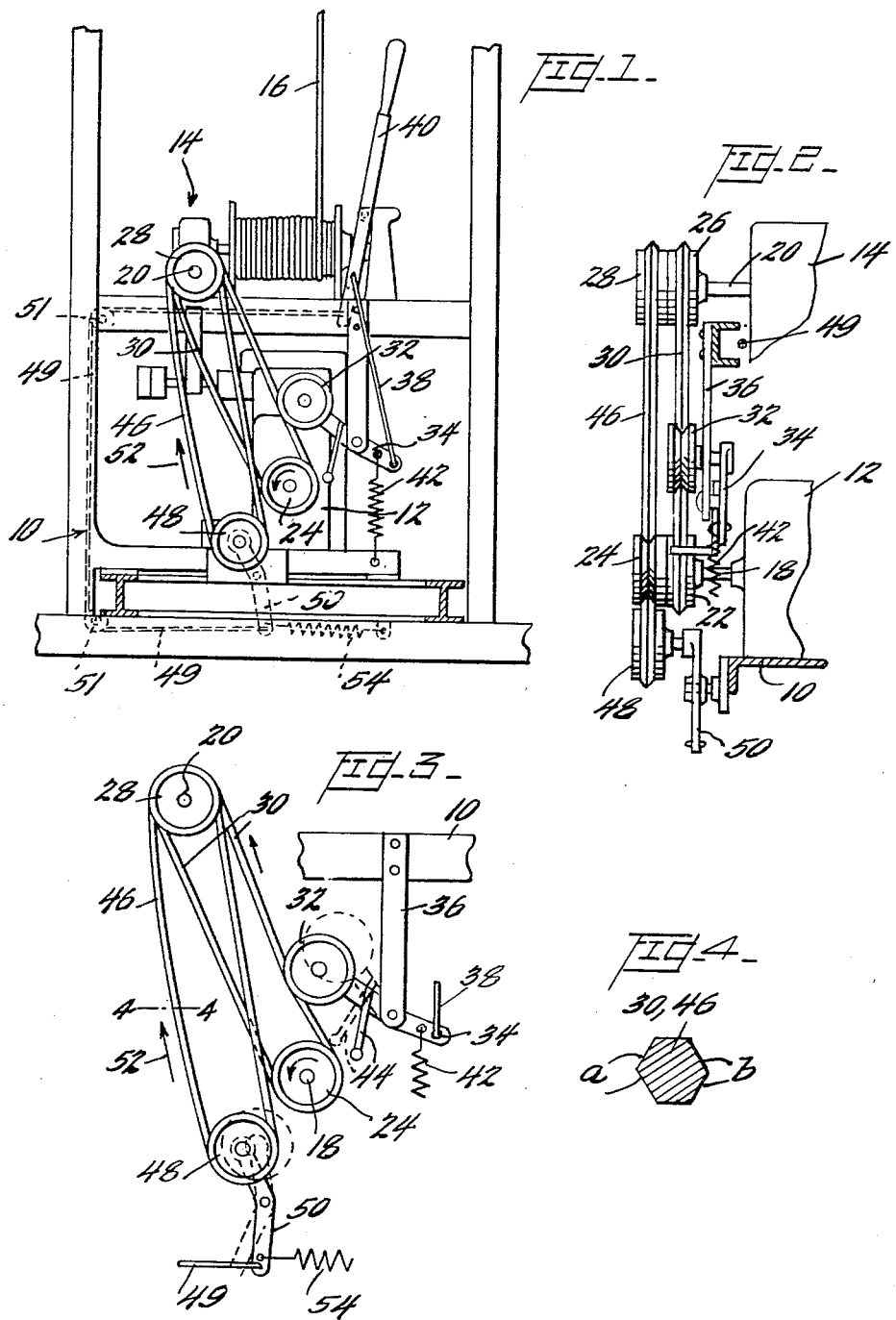

3,396,590
BELT TRANSMISSION DEVICE
Holcombe M. Verdery, Jr., P.O. Box 157,
Harlem, Ga. 30814
Filed Feb. 2, 1966, Ser. No. 524,603
5 Claims. (Cl. 74—220)

ABSTRACT OF THE DISCLOSURE

The invention comprises a belt drive transmission for forward and reverse drive including driving and driven members, each having a pair of pulleys, a first extended length forward drive belt trained over pulleys on the members and an idler pulley for tightening the forward drive belt, a second reverse drive belt trained over the driving member and over a second, movable idler pulley, which is movable to press an exterior surface of the reverse belt against a pulley on the driven member, and a manual lever with cable means for selectively moving the idler pulleys into driving position.

---

This invention relates to transmission devices, and, in particular, to an improved belt drive transmission assembly.

Generally, the invention comprises a transmission device constructed solely of belts and pulleys, without the need of complex and expensive gear or clutch devices. The invention is adapted to transmit, selectively, forward and reverse rotational drive to a driven member. The invention includes a driving and a driven member each having a pair of pulleys thereon, a forward drive belt of extensive length trained over pulleys on the driving and driven member, an idler pulley to tighten the forward drive belt, a second idler pulley, a reversing drive belt trained over the second idler pulley and the driven member and having an exterior surface which may be pressed against a pulley on the driving member to tighten the reversing belt and thus impart reversed rotational motion to the driven member.

It is the principal object of this invention to provide a reversing belt transmission device constructed without benefit of gears or clutch devices.

Another object of the invention is to provide a device of the above character employing two drive belts of extensive length, selectively engageable to transmit power.

Yet another object of the invention is to provide a transmission device of optimum simplicity.

Finally, it is an object of the invention to provide a power transmission device which is low in cost of manufacture.

In the preferred embodiment of the invention, the invention is applied to transmit rotational motion from a power source, such as a gasoline or electric motor, to a winch, for use with a crane or the like for raising and lowering material such as logs, stones, or any item of considerable bulk that one might wish to move. The invention has countless other applications, such as providing a simple transmission for lawnmowers, small, powered tilling devices, tractors, and small powered vehicles such as golf carts, tractors, or even toy vehicles.

Further and more complete objects of the invention as well as details of construction may be had by reference to the following specification and drawings in which:

FIGURE 1 is an elevational, side view of the invention as applied to transmit power from a gasoline motor to a winch;

FIGURE 2 is a partial, end view of the device as shown in FIGURE 1, and drawn to an enlarged scale;

FIGURE 3 is a view, similar to FIGURE 1, but drawn to an enlarged scale and with parts removed for simplicity; and FIGURE 4 is a sectional view taken along lines 4—4 of FIGURE 3.

Referring now to the drawing by reference character, and in particular to FIGURE 1, there is shown a frame assembly 10 having a standard gasoline engine 12 and a standard winch 14 mounted thereon. In the embodiment shown in FIGURE 1, frame 10 is the base of a crane structure (not shown) mounted thereon, cable 16 of winch 14 being the hoisting cable for said crane.

Motor 12 includes a rotating, output drive shaft 18, or driving member and winch 14 includes a rotatable, input shaft 20, or driven member.

As shown best by FIGURES 2 and 3, an interior pulley 22 and an exterior pulley 24 are mounted on driving member 18 and mating pulleys including interior pulley 26 and exterior pulley 28 are mounted on driven member 20. Obviously, pulleys 22 and 24, and pulleys 26 and 28 could each be made of a single pulley element having two circumferential exterior grooves therein. A forward drive belt 30 of extensive length is trained over interior pulleys 22 and 26. A pivoting idler pulley 32 is mounted on one end of a bell crank 34 and is freely rotatable thereon. Bell crank 34 is pivotally mounted on the end of a depending bracket 36 which is rigidly secured to frame assembly 10. Pivotal movement of bell crank 34 is controlled so as to selectively depress idler pulley 32 against the exterior surface of forward drive belt 30 thus tightening the same with respect to pulleys 22 and 26 and causing rotational motion to be transmitted from driving member 18 to driven member 20. When pulley 32 is released from engagement with forward drive belt 30, no power will be transmitted from the driving member 18 to the driven member 20 as drive belt 30 will ride loosely on pulleys 22 and 26 due to its extensive length.

Movement of bell crank 34 may be controlled in a desired fashion, such as by cable 38 attached to a hand operated lever 40, mounted on frame assembly 10. A resilient return spring 42 may be secured to bell crank 34 adjacent cable 38 and to frame assembly 10 to urge idler pulley 32 away from drive belt 30. A stabilizer arm 44 is mounted on bell crank 34 and is used to control slack in drive belt 30 when the same is inoperative. As shown in FIGURE 3, by dash lines, stabilizer arm 44 contacts drive belt 30 immediately forwardly of pulley 22, when pulley 32 is moved out of contact with drive belt 30. Thus, excessive flopping of drive belt 30 on pulley 22 is prevented, thereby minimizing the chances of belt 30 engaging pulley 22 when such is not desired.

The reversing means of the invention includes outer pulley 28 on shaft 20, a reverse drive belt of extensive length indicated by numeral 46, a reversing idler pulley 48, and reversing pulley 24 on drive shaft 18. As in the case of drive belt 30, drive belt 46 is of extensive length so as not to engage pulleys 28 and 48 when pulley 48 is in an inoperative position, as indicated by solid lines in FIGURE 3. Idler pulley 48 is mounted on a portion of frame 10, as shown in FIGURE 1. Bell crank 50 may be operated in any desired manner, such as through cable 49 which is trained over guides 51 and attached to lever 40 in the manner shown in FIGURE 1. When bell crank 50 is moved to the position indicated by dotted lines in FIGURE 3, it will cause drive belt 46 to abut against pulley 24, thus tightening the slack therein, and causing belt 46 to travel in the direction indicated by arrow 52 which, through action of pulley 28, causes shaft 20 to be rotated in a direction opposite that provided by drive belt 30 when the latter is engaged. A second return spring 54 may be secured to the lower end of bell crank 50 and to frame 10 to urge the bell crank 50 to an inoperative position.

The operation of the invention will now be discussed. The forward drive transmission portion of the invention is used to rotate drive shaft 18 and input shaft 20 in the same, or a forward, direction. For present purposes, this motion is counterclockwise, with respect to FIGURE 1. In order to engage drive belt 30 with pulleys 22 and 26, the operator moves lever 40 in a right-hand direction, with respect to FIGURE 1. This movement, operating through cable 38, causes idler pulley 32 to be depressed downwardly against drive belt 30 thereby tightening the slack therein and causing rotational power to be transmitted from drive shaft 18 to input shaft 20 of winch 14. To drive input shaft 20 in a reverse fashion, or rotate the same in a clockwise direction with respect to FIGURE 1, idler pulley 32 is released from drive belt 30 by moving lever 40 in a lefthand direction. The tension in cable 38 will be released, thereby permitting spring 42, acting through bell crank 34, to move idler pulley 32 to the position indicated by dash lines in FIGURE 3. It is noted here that this movement causes stabilizer arm 44 to be moved adjacent drive belt 30 to prevent excessive flopping of drive belt 30 in the manner hereinbefore discussed. Movement of lever 40 to disengage idler pulley 32 causes reverse idler pulley 48 to move to the position indicated by dash lines in FIGURE 3, through the action of cable 49 secured to lever 40. Thus, slack in reverse drive belt 46 is tightened by belt 46 being pressed against pulley 24. The normal, counter-clockwise rotation of pulley 24 by drive shaft 18 causes reverse drive belt 46, pulley 28, and input shaft 20 to be rotated in a clockwise fashion, as indicated by arrow 52, due to the position of pulley 24 between pulleys 48 and 28, exteriorly of and against drive belt 46.

In order to assure firm engagement of drive belt 30 with pulleys 22, 26 and 32, and drive belt 46 with pulleys 24, 28, and 48, both drive belts 46 and 30 are desirably hexagonal in cross-section as shown in FIGURE 4. The drive belts employed might more appropriately be termed "double-V" drive belts, having driving surfaces *a* and *b*.

It can be seen from the foregoing that I have invented a new, and highly useful device in the art of belt drive transmission devices, and therefore, I am not to be limited to the exact construction as hereinbefore provided, except as may be deemed to be within the scope of the following claims.

I claim:
1. A reversible power transmission assembly for optionally rotating a driven member from a driving member comprising forward drive means, including a first interior pulley on the driving member, a second interior pulley on the driven member, a forward drive belt of extensive length trained over said first and second interior pulleys, and a forward idler pulley mounted adjacent said first drive belt and selectively engageable therewith to tighten said forward drive belt for driving said second interior pulley from said first interior pulley; reverse drive means including a first exterior pulley on the driving member, a second exterior pulley on the driven member, a reverse idler pulley mounted beyond the span between said first and second exterior pulleys and to one side of said first exterior pulley, and a reverse drive belt of extensive length trained over said second exterior pulley and said reverse idler pulley, said reverse idler pulley movable to engage said reverse drive belt with said first exterior pulley for driving said second exterior pulley, and means for selectively moving said forward and reverse drive means to operative and inoperative positions, comprising a manual operating lever, pivotally mounted medially thereof, a forward drive cable, secured to the free end of said lever, and arranged to move said forward idler pulley to an operative position, a reverse drive cable, secured to said free end of the lever and arranged to move said reverse idler pulley to an operative position, first return spring means, biasing said forward idler pulley to an inoperative position, and second return spring means, biasing said reverse idler pulley to an inoperative position, said forward drive means operative when said reverse drive means is inoperative and said reverse drive means operative when said forward drive means is inoperative.

2. The device of claim 1 wherein said forward drive means includes a bell crank, said forward idler pulley being freely rotatably mounted on one arm thereof, said means for selectively moving said forward drive means being secured to the arm opposite said one arm, and a stabilizer member mounted on said one arm, being arranged to contact said forward drive belt adjacent said first interior pulley when said means for selectively moving said forward drive means is in inoperative position, thereby preventing excessive flopping of said drive belt about said driving member.

3. The device of claim 2 wherein the free end of said stabilizer is provided with anti-friction means for contacting said forward drive belt.

4. The device of claim 1 wherein said reverse drive means is provided with a bell crank, said reverse idler pulley being freely rotatably mounted on one arm thereof, said means for selectively moving said reverse drive means secured to an arm opposite said one arm.

5. The device of claim 1 wherein each of said drive belts is generally hexagonal in cross-section.

References Cited
UNITED STATES PATENTS

| | | | |
|---|---|---|---|
| 1,160,537 | 11/1915 | Siddall | 74—220 |
| 2,718,154 | 10/1955 | Mathson | 74—220 |
| 2,924,994 | 2/1960 | Adee | 74—220 |
| 3,108,481 | 10/1963 | Westmont | 74—220 |
| 3,291,452 | 12/1966 | Rau | 254—186 |

EVON C. BLUNK, *Primary Examiner.*

H. C. HORNSBY, *Assistant Examiner.*